United States Patent Office 3,023,534
Patented Mar. 6, 1962

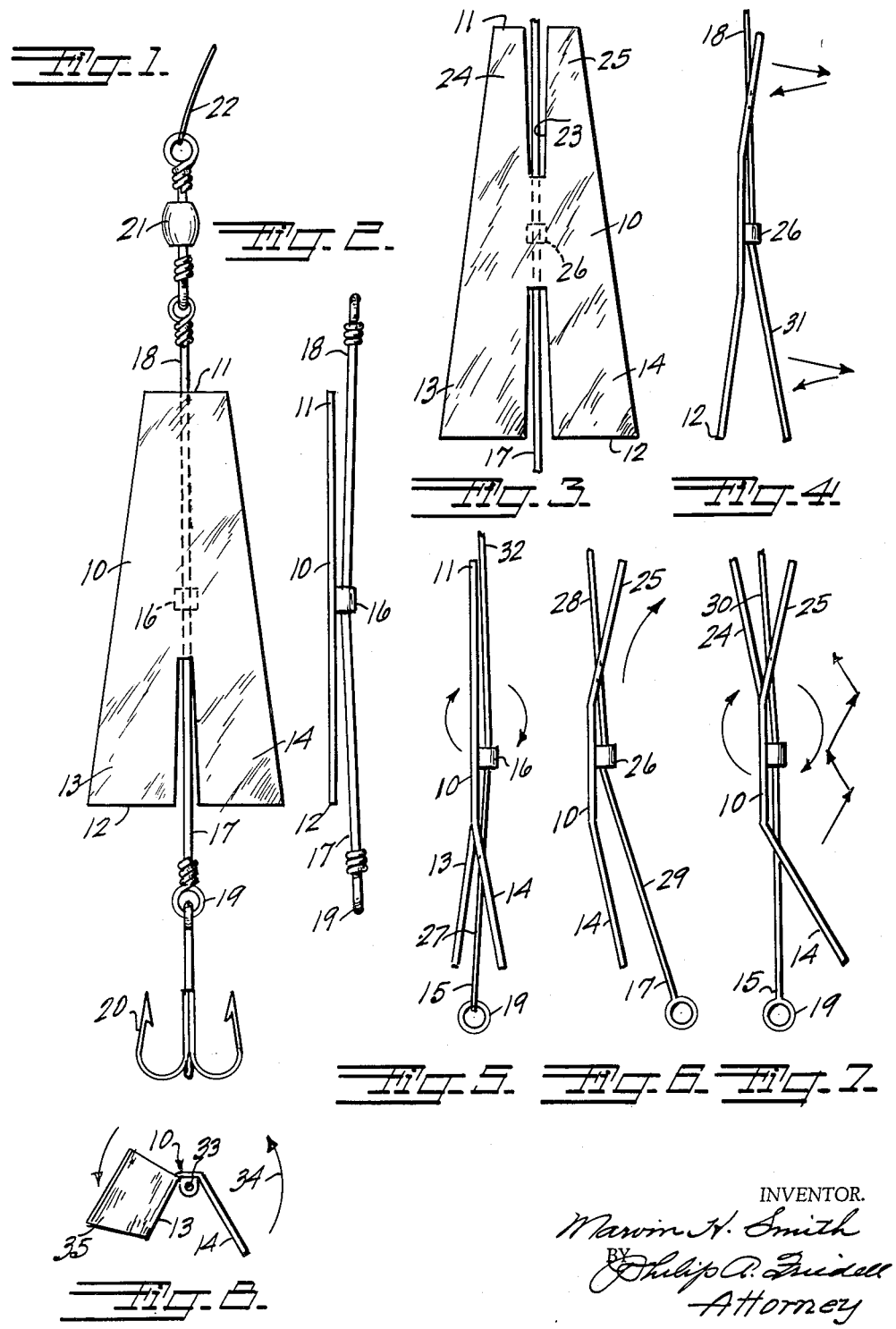

3,023,534
FISH LURE FORMS
Marvin H. Smith, 2417 Rosewood Ave., Spokane, Wash.
Filed Aug. 31, 1959, Ser. No. 837,205
2 Claims. (Cl. 43—42.22)

This invention relates to improvements in fish lures, and provides a lure which can be formed at will by hand to provide any desired type of maneuvering to suit the specific fishing conditions, every different type of fish being best lured by a specific maneuver of the bait, though in some cases, a different maneuver may be found more effective at a different time of day with the same fish, and the lure which is the subject of my invention can be altered at will, without the use of tools of any kind, since it is formed of an easily bendable material.

The most satisfactory types of lure maneuver also varies considerably between small and large streams, eddies, and lakes and ocean fishing, the only substitution found necessary being in the size of the lure and of the hook.

It is known that many types of lures have been developed, but are all made to some specific form, not subject to manual adjustment with the exception of one which is formed of a springy material in which the tail fins can be sprung upwardly at a slight angle by the wedging action of a pin which is easily lost.

My fish lure can be formed at will to rotate slowly or rapidly, wabble, dive, rise, rotate and reciprocate, in fact can be formed to provide a great number of different actions in the water, so long as there is relative movement between the lure and the water, and is therefore suited to running streams, casting, or trolling, the invention actually consisting of the form for, or unformed lure, and which consists of a thin plate of easily bendable material such as copper, aluminum, soft steel, soft bronze or other suitable materials which can readily be bent by hand to various forms without the aid of tools of any kind, so that the forms can be developed at any time, as desired.

The objects and advantages of the invention are as follows:

First, to provide a form for a fish lure and which consists entirely of readily bendable material for hand forming at will to suit the fishing conditions.

Second, to provide a form as outlined in which the lure consists of a relatively thin plate of bendable material and having a pull rod formed of easily bendable material and having a single point of attachment substantially centrally of the plate and provided with a swivel conection at one end to permit free rotative movement of the lure, and with the pull rod extending beyond both ends of the plate for further control of the lure and for attachment of the hook and the line or leader.

Third, to provide a lure as outlined which is of the simplest possible construction and economical to manufacture.

In describing the invention reference will be had to the accompanying drawings, in which:

FIG. 1 is a front elevation of the invention with swivel, hooks and leader attached.

FIG. 2 is a side elevation of FIG. 1, with hooks, swivel and leader omitted.

FIG. 3 is a modification in which both ends of the lure plate are slotted for increased maneuverability.

FIG. 4 is a side elevation of FIG. 3 with the nose and tail fins hand formed to provide a wabbling motion to the lure.

FIG. 5 shows the tail fins bent angularly in opposition for continuous rotation of the lure.

FIG. 6 shows the nose and tail portions bent for diving to a predetermined depth then turning over and rising, in a series of cycles.

FIG. 7 shows the front fins formed to rotate while the rear fins are both formed downwardly to provide both, continuous rotating and wabbling motions.

FIG. 8 shows both wings bent down with one tail fin bent outwardly at an angle to provide rotation with wabbling from side to side.

The invention is subject to many additional gyrations and maneuverings, depending on the angles of adjustments of the fins, the wings, and the respective ends of the pull rod, only a few of the established forms being shown, and all of which are easily formed by the hands without the aid of any tools or implements, the invention consisting of the lure plate 10 which is shown as frusto-triangular in form, the narrow end 11 being the nose or leading end, while the wide end 12 is the tail or follow end, it being wider for the specific purpose of controlling the nose or leading end to limit descent in diving and promote wabbling and darting, the tail end being slotted to about one third the length of the plate, not only to form the fins 13 and 14, but having sufficient width only to freely clear the pull rod to also permit the pull rod end 15 to be bent up therethrough as indicated in FIGS. 5 and 7, this being a very important feature of this invention.

It will be noted that the pull rod has a single point of attachment to the plate, about centrally as indicated at 16, and which may be accomplished by welding, soldering, or any other suitable means, and that both ends extend beyond the respective ends of the plate as indicated at 17 and 18, and being provided at the tail or follow end with means 19 for attachment of a hook 20, and having a swivel 21 at the leading end to which the line or leader 22 is attached.

The type just described has proven very effective for trout, bass and similar types of fish, and particularly effective in relatively fast flowing streams or in line casting and retrieving; however, where large game fish become the object of the sport, the modification illustrated in FIGS. 3 and 4 is particularly desirable because possible adjustments are considerably increased to provide for more decisive and violent reactions when trolling, the plate, though being identical in all other respects, is additionally slotted in from the nose or leading edge, the bottoms of both slots being just sufficiently wide to clear the pull rod when bent up therethrough for centering the pull rod relative to the axis of the lure, and being tapered slightly to the open ends for easier threading therein, and like the previously described type, is frusto-triangular in form; the slot being indicated at 23 permitting the nose fins 24 and 25 to also be adjusted, the pull rod, as in the first described type, having preferably only a single point of attachment as indicated at 26, and in view of the slot 23, the leading end of the pull rod can even be bent up at right angles through that slot, if desired, this being an important feature as will be realized upon inspection of FIGS. 4, 5, 6 and 7 with reference to the respective ends of the pull rod at 27, 28, 29 and 30, such adjustments being necessary when certain specific maneuvers or operations of the formed lure are desired.

FIGS. 1 2 and 3 show the lure form as it will be supplied and which is to be formed by hand to any desired one of a number of different forms, a few of which are illustrated. For example: FIG. 4 has the nose fins turned down and the tail fins turned up, while the follow end of the pull rod is turned decidedly down. With this adjustment the lure will naturally rotate erratically in the water, but will wabble continuously at a relatively low speed because of the slight angle of the fins. Increasing the angles of the fins increases the speed of wabbling, but these actions would not occur were it not for the bent down follow end of the pull rod indicated at 31.

In FIG. 5, the connection are in the plane of the plate as indicated at 27 and 32, and the tail fins are bent angularly in opposition. With this adjustment the plate or lure will rotate at relatively low speed and which speed can be increased by merely increasing the angle of the fins.

FIG. 6 shows the adjustment for diving and darting in all directions, while FIG. 7 shows the adjustment for rapid rotation or spinning coupled with a wabbling and darting motion. FIG. 8 shows both wings bent down with the follow end of one tail fin bent angularly outward, which creates an entirely different effect from that of the plane wings since the wings will spin about the axis 33 as indicated at 34. The bent portion of fin 13 being indicated at 35.

It will be noted that applicant does not attach either the line or the hook to the lure proper or plate, that his connections are through a separate rod which also is hand formable to any desired angle; that he does not attempt to simulate a fish or any other type of bait; that the plate is slotted in from one or both ends, with the slots wide enough to pass the pull rod; that the line is connected to the pull rod through a swivel, and the pull rod has a single point connection to the plate, and thereby differentiates from all known lures.

I claim:

1. A fish lure form adapted to be formed to various lure shapes at will, comprising a sheet of easily bendable material having a lead end and a follow end, and a central point of attachment, there being a slot formed inwardly in each the lead end and follow end and each to a depth in excess of one half the distance to the central point of attachment, to thereby form a pair of wings with nose fins and tail fins, all selectively hand formable and alterable at will, and a pull rod having a length in excess of the length of the sheet and rigidly attached substantially centrally of its length to the central point of attachment and bendable upwardly through the respective slots at will for additionally controlling maneuvers and gyrations of the formed lure.

2. A fish lure form comprising a plate having a bottom face and formed of material adapted to be bent selectively throughout to form a plurality of different types of lures by hand, at will, and having a lead end and a follow end, and a pull rod formed of easily bendable material and having a fixed rigid single point connection intermediate its length to said bottom face substantially centrally of the area thereof, with the respective ends of the pull rod terminating respectively in a swivel for connection of a fish line, and in connecting means for a fish hook, and said plate having a slot formed inwardly from one end and extending inwardly the major portion of the distance to said point connection, and having a width slightly greater than the thickness of the pull rod, whereby the plate and pull rod may be selectively bent and altered at will to produce a variety of different gyrations in relatively moving water.

References Cited in the file of this patent

UNITED STATES PATENTS

| 496,441 | Pepper | May 2, 1893 |
| 967,660 | Pedersen | Aug. 16, 1910 |
| 1,573,288 | Wilson | Feb. 16, 1926 |

FOREIGN PATENTS

| 1,086,388 | France | Aug. 11, 1954 |